(12) United States Patent
Takase et al.

(10) Patent No.: US 8,080,195 B2
(45) Date of Patent: Dec. 20, 2011

(54) PROCESS FOR PRODUCTION OF FLUORINE-CONTAINING POLYMERS AND FLUORINE-CONTAINING POLYMERS

(75) Inventors: Yoshiyuki Takase, Settsu (JP); Kenji Ishii, Settsu (JP); Shouji Fukuoka, Settsu (JP)

(73) Assignee: Daikin Industries, Ltd, Tokyo (JP)

( * ) Notice: Subject to any disclaimer, the term of this patent is extended or adjusted under 35 U.S.C. 154(b) by 231 days.

(21) Appl. No.: 10/579,790

(22) PCT Filed: Nov. 19, 2004

(86) PCT No.: PCT/JP2004/017262
§ 371 (c)(1),
(2), (4) Date: May 18, 2006

(87) PCT Pub. No.: WO2005/049661
PCT Pub. Date: Jun. 2, 2005

(65) Prior Publication Data
US 2007/0112155 A1   May 17, 2007

(30) Foreign Application Priority Data
Nov. 20, 2003   (JP) .................................. 2003-391281

(51) Int. Cl.
*B27N 3/08*   (2006.01)
(52) U.S. Cl. .......... 264/83; 526/242; 526/247; 526/253; 526/255; 528/499; 528/502 F; 525/326.2
(58) Field of Classification Search .................. 526/242, 526/247; 528/499, 502 F; 264/83; 525/326.2
See application file for complete search history.

(56) References Cited

U.S. PATENT DOCUMENTS

| | | | |
|---|---|---|---|
| 3,085,083 A | | 4/1963 | Schreyer |
| 3,674,758 A | * | 7/1972 | Carlson ...................... 525/326.2 |
| 4,340,680 A | * | 7/1982 | Asawa et al. ................... 521/27 |
| RE32,199 E | * | 7/1986 | Carlson ......................... 526/206 |

(Continued)

FOREIGN PATENT DOCUMENTS
EP   0 150 953 A2   8/1985
(Continued)

OTHER PUBLICATIONS

Carlson, D.P. et al., "Organic fluoropolymers," in Ullmann's Encyclopedia of Industricial Chemistry, 5th Edition. pp. 393-429, 1988.

(Continued)

*Primary Examiner* — Mark Eashoo
*Assistant Examiner* — Nicole M Buie-Hatcher
(74) *Attorney, Agent, or Firm* — Sughrue Mion, PLLC

(57) ABSTRACT

A method of producing a fluoropolymer by which a melt-processable fluoropolymer (A) having a specific unstable terminal group or groups (P) is subjected to melt-kneading in a kneader having a stabilization treatment zone to thereby produce a fluoro-polymer (B) resulting from conversion of the specific unstable terminal group or groups (P) to —$CF_2H$. The specific unstable terminal group or groups (P) include alkoxycarbonyl groups, fluoroalkoxycarbonyl groups and/or carboxyl group quaternary nitrogen compound salts, the melt-kneading is carried out in the absence or presence of an alkali metal element or alkaline earth metal element, the content of the alkali metal element or alkaline earth metal element is not greater than 2 ppm of the composition under melt-kneading, and the melt-kneading in the stabilization treatment zone is carried out in the presence of water. A fluoro-polymerised material is also disclosed.

5 Claims, 1 Drawing Sheet

U.S. PATENT DOCUMENTS

| | | | |
|---|---|---|---|
| 4,626,587 A * | 12/1986 | Morgan et al. | 528/481 |
| 5,045,605 A * | 9/1991 | Buckmaster | 525/378 |
| 5,608,020 A * | 3/1997 | Colaianna et al. | 526/206 |
| 6,451,962 B1 | 9/2002 | Hiraga et al. | |
| 2003/0208005 A1 * | 11/2003 | Hiraga et al. | 525/326.4 |

FOREIGN PATENT DOCUMENTS

| | | |
|---|---|---|
| EP | 0 789 038 A1 | 8/1997 |
| EP | 0 928 673 A1 | 7/1999 |
| EP | 1 083 189 A1 | 3/2001 |
| EP | 1 170 303 A1 | 1/2002 |
| EP | 1 260 526 A1 | 11/2002 |
| JP | 37-3127 | 5/1959 |
| JP | 46-23245 | 7/1971 |
| JP | 3-500547 | 2/1991 |
| JP | 3-500547 A | 2/1991 |
| JP | 2000-198813 | 7/2000 |
| JP | 2000-198813 A | 7/2000 |
| JP | 2002-535456 | 10/2002 |
| WO | 89/11495 | 11/1989 |
| WO | WO 89/12240 | 12/1989 |
| WO | WO 00/26260 | 5/2000 |
| WO | WO 00/44797 | 8/2000 |
| WO | WO 01/18076 | 3/2001 |
| WO | WO 01/18076 A1 | 3/2001 |

OTHER PUBLICATIONS

Rosato, D.V. et al., Concise Encyclopedia of Plastics, USA: Kluwer Academic Publishers, pp. 329 and 357-359, 2000.

* cited by examiner

PROCESS FOR PRODUCTION OF FLUORINE-CONTAINING POLYMERS AND FLUORINE-CONTAINING POLYMERS

TECHNICAL FIELD

This invention relates to a method of producing a fluoropolymer and to a fluoro-polymerised material.

BACKGROUND ART

When a fluoropolymer is produced by emulsion polymerization, carboxyl group formation occurs at one or both main chain ends thereof due to the use of such a polymerization initiator as a persulfate salt. This carboxyl group is thermally unstable and is decomposed on the occasion of melt molding, generating a volatile matter and thus deteriorating the moldability of the fluoropolymer. Therefore, it is necessary to stabilize this unstable terminal group prior to subjecting the fluoropolymer to molding.

An old known method of stabilizing carboxyl group-containing fluoropolymers comprises adding water to a powder as obtained after polymerization and heating the mixture at an elevated temperature (cf. e.g. Patent Document 1: Japanese Kokoku Publication S37-3127). In this document, it is alleged that the addition of an alkali metal promotes the conversion of the carboxyl group to stable —$CF_2H$ and, even in the absence of any alkali metal, the carboxyl group is converted to —$CF_2H$. However, this method has a problem, namely it allows a large number of carboxyl groups not yet converted to —$CF_2H$ to remain.

Also known as methods of stabilizing the carboxyl group by conversion to —$CF_2H$ are the methods comprising melt-kneading the polymer in a twin-screw extruder while introducing air and water thereinto (cf. e.g. Patent Document 2: Japanese Kokai Publication H12-198813; Patent Document 3: WO 01/018076). The methods disclosed in these documents can give a very high rate of conversion to —$CF_2H$ but still have a problem, namely they allow a metal fraction to remain, though in very slight amounts, in the pellets obtained. In addition, the method of Patent Document 3 has a further problem: when the melt flow rate [MFR] of the fluoropolymer is increased, the number of terminal groups increases, so that the stabilization by conversion to —$CF_2H$ becomes insufficient unless the alkali addition level is increased.

The metal residue may possibly cause degradation and decomposition of the fluoropolymer at high processing temperatures. This decomposition may possibly lead to discoloration and degradation as well as nozzle blocking. In electric wire covering molding, these cause molecular fraction on the nozzle outlet surface, which negatively affects the process. The so-called cornbreak, namely breaking or cracking of the covering, can also occur. Once cornbreak has occurred, it is inevitable to stop the covering process and then restart the process and, further, wait for a certain period of time until the system arrives again at the equilibrium. This makes it difficult to continue the process for a prolonged period of time, reducing the productivity (cf. e.g. Patent Document 4: Japanese Kohyo Publication 2002-535456).

A method for stabilizing the carboxyl group without using any alkali metal or other metal has been proposed which comprises treating a fluoropolymer as obtained after polymerization with fluorine gas (cf. e.g. Patent Document 5: Japanese Kokoku Publication S46-23245). However, this method requires equipment for fluorination and for removal of fluorine gas and, in addition, fluorine gas itself is highly toxic, producing a safety problem.

Patent Document 1: Japanese Kokoku Publication S37-3127
Patent Document 2: Japanese Kokai Publication H12-198813
Patent Document 3: WO 01/018076
Patent Document 4: Japanese Kohyo Publication 2002-535456
Patent Document 5: Japanese Kokoku Publication S46-23245

DISCLOSURE OF THE INVENTION

Figure 1:
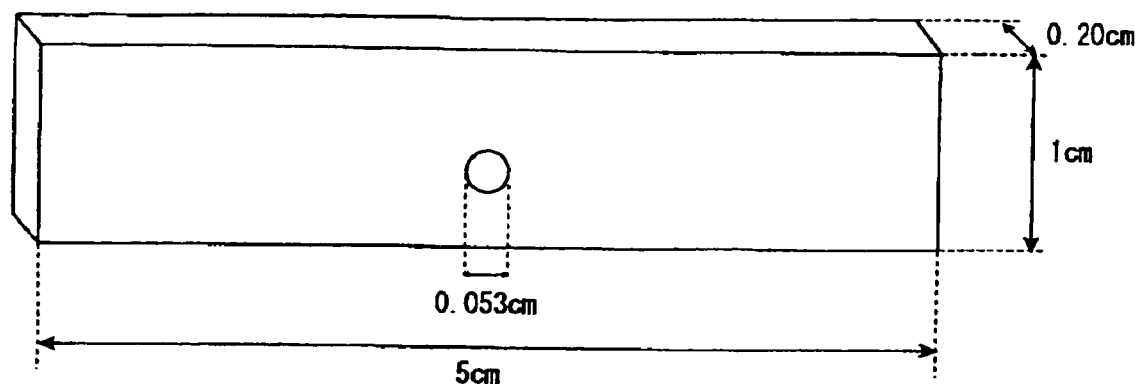
FIG. 1 is a schematic representation of a metal plate having a cylindrical hole, which is to be used in strip testing.

Problems which the Invention is to Solve

It is an object of the present invention to provide a method of producing a fluoropolymer high in terminal group stability and excellent in moldability.

Means for Solving the Problems

The present invention relates to a method of producing a fluoropolymer by which a melt-processable fluoropolymer (A) having a specific unstable terminal group or groups (P) is subjected to melt-kneading in a kneader comprising a stabilization treatment zone to thereby produce a fluoropolymer (B) resulting from conversion of said specific unstable terminal group or groups (P) to —$CF_2H$, said specific unstable terminal group or groups (P) comprising alkoxycarbonyl groups, fluoroalkoxycarbonyl groups and/or carboxyl group quaternary nitrogen compound salts, the melt-kneading being carried out in the absence or presence of an alkali metal element or alkaline earth metal element, the mass of said alkali metal element or alkaline earth metal element being not greater than 2 ppm of the composition under melt-kneading, and the melt-kneading in said stabilization treatment zone being carried out in the presence of water.

The present invention relates to a fluoro-polymerised material comprising a fluoropolymer, wherein said fluoropolymer comprises (1) a fluorocopolymer derived from at least one fluoromonomer selected from the group consisting of tetrafluoroethylene, hexafluoropropylene, vinylidene fluoride and chlorotrifluoroethylene, (2) a chlorotrifluoroethylene homopolymer and/or (3) a vinylidene fluoride homopolymer, said fluorocopolymer is one resulting from polymerization of a perfluoro(alkyl vinyl ether) and/or ethylene or one not resulting from such polymerization, said fluoropolymer is one of which polymer terminal groups are —$CF_2H$ and not more than 20 unstable terminal groups (Q) per $10^6$ carbon atoms, said fluoro-polymerised material contains or does not contain a metal residue containing an alkali metal element and/or alkaline earth metal element, and the mass of said alkali metal element and/or alkaline earth metal element is not greater than 2 ppm of the fluoro-polymerised material.

In the following, the present invention is described in detail.

The method of producing a fluoropolymer according to the invention is a method of producing a fluoropolymer by which a melt-processable fluoropolymer (A) having a specific unstable terminal group or groups (P) is subjected to melt-kneading in a kneader comprising a stabilization treatment zone to thereby produce a fluoropolymer (B) resulting from conversion of said specific unstable terminal group or groups (P) to —CF$_2$H.

The fluoropolymer (A) is a fluoropolymer which is melt-processable and has a specific unstable terminal group or groups (P).

The specific unstable terminal groups (P) comprise alkoxycarbonyl groups, fluoroalkoxycarbonyl groups and/or carboxyl group quaternary nitrogen compound salts.

Preferred as the alkoxycarbonyl groups are groups represented by —COOR [R being an alkyl group containing 1 to 10 carbon atoms]. Preferred as the group R are alkyl groups containing 1 to 5 carbon atoms. More preferred are alkyl groups containing 1 to 3 carbon atoms. Still more preferred is —CH$_3$.

Preferred as the fluoroalkoxycarbonyl groups are groups represented by —COORf [Rf being a fluoroalkyl group containing 1 to 10 carbon atoms]. Preferred as the group Rf are fluoroalkyl groups containing 1 to 5 carbon atoms. More preferred are fluoroalkyl groups containing 1 to 3 carbon atoms. Still more preferred is —CF$_3$. The fluoroalkyl group represented by Rf is a group derived from an alkyl group by substitution of at least one carbon-bound hydrogen atom by a fluorine atom; it may be a perfluoroalkyl group.

The carboxyl group quaternary nitrogen compound salts are groups resulting from ion pair formation of the carboxylate group [—COO$^-$] and a nitrogen compound which is a univalent cation. Preferred as the carboxyl group quaternary nitrogen compound salts are groups represented by —COONHR$^1$R$^2$R$^3$ [in which R$^1$, R$^2$ and R$^3$ may be the same or different and each is H, an alkyl group containing 1 or 2 carbon atoms or a fluoroalkyl group containing 1 or 2 carbon atoms]. As such groups, there may be mentioned, for example, —COONH$_4$, —COONH(C$_2$H$_5$)$_3$ and the like. The carboxyl group quaternary nitrogen compound salts may be dissociated in the presence of water.

The fluoropolymer (A) may contain one or more specific unstable terminal group (P) species in each molecule. From the ease of preparation viewpoint, however, the fluoropolymer (A) preferably contains only one group (P) species. Molecules of the fluoropolymer (A) may contain different specific unstable terminal group (P) species among the molecules. From the ease of preparation viewpoint, however, the molecules of the fluoropolymer (A) preferably contain one and the same species.

Preferred as the specific unstable terminal groups (P) are the above-mentioned alkoxycarbonyl groups and fluoroalkoxycarbonyl groups. More preferred are the above-mentioned alkoxycarbonyl groups.

The specific unstable terminal groups (P) can be obtained by conversion from —COOM (M being hydrogen, alkali metal or alkaline earth metal) capable of being formed at a main chain terminus or a side chain terminus during the process of polymerization. The method of this conversion is not particularly restricted but any of the methods known in the art, for example the methods comprising reacting with an alcohol, a fluoroalcohol or ammonia, respectively, may be used. The above-mentioned —COOM is generally formed in the process of emulsion polymerization.

The fluoropolymer (A) is not particularly restricted but may be any of those which have the above-mentioned specific unstable terminal groups (P) and, in addition, are melt-processable, preferably (1) a fluorocopolymer derived from at least one fluoromonomer selected from the group consisting of tetrafluoroethylene [TFE], hexafluoropropylene [HFP], vinylidene fluoride [VdF] and chlorotrifluoroethylene [CTFE], (2) a chlorotrifluoroethylene homopolymer [PCTFE] and/or (3) a vinylidene fluoride homopolymer [PVdF]. The fluorocopolymer (1) is one resulting from polymerization of a perfluoro(alkyl vinyl ether) [PAVE] and/or ethylene [Et] or one not resulting from such polymerization.

The perfluoro(alkyl vinyl ether) is not particularly restricted but includes, among others, perfluoro(methyl vinyl ether)[PMVE], perfluoro(ethyl vinyl ether) and perfluoro (propyl vinyl ether) [PPVE]. Among them, PPVE is preferred from the good heat resistance viewpoint. One or more of such PAVEs may be used in producing the fluorocopolymers (1).

The fluorocopolymers (1) are not particularly restricted but include, among others, FEP-based copolymers such as TFE/HFP copolymers [FEP] and TFE/HFP/PAVE copolymers; TFE/PAVE-based polymers such as TFE/PMVE copolymers [MFA] and TFE/PPVE copolymers [PFA]; ETFE-based polymers such as Et/TFE copolymers [ETFE]; ECTFE-based polymers such as Et/CTFE copolymers [ECTFE]; and TFE/VdF copolymers.

Among them, preferably the fluoropolymer (A) is a fluorocopolymer derived from TFE and HFP.

The fluorocopolymer derived from TFE and HFP is the one obtained by polymerization of at least TFE and HFP. It may be the one obtained by polymerization of a PAVE and/or Et in addition to TFE and HFP. Preferred are TFE/HFP copolymers [FEP] and TFE/HFP/PAVE copolymers and like FEP-based copolymers.

Preferably, the fluorocopolymer derived from TFE and HFP is a fluorocopolymer having a tetrafluoroethylene unit content of 75 to 95% by mass, a hexafluoropropylene unit content of 5 to 20% by mass and a perfluoro(alkyl vinyl ether) unit content of 0 to 5% by mass.

The "tetrafluoroethylene unit", "hexafluoropropylene unit" and "perfluoro(alkyl vinyl ether) unit" are molecular structural parts of each fluorocopolymer and respectively are TFE-, HFP- and PAVE-derived segments.

The tetrafluoroethylene, hexafluoropropylene and perfluoro(alkyl vinyl ether) units, in total, amount to 100% by mass. The fluorocopolymers derived from TFE and HFP are not always required to contain the perfluoro(alkyl vinyl ether) unit in their molecular structure.

According to the method of producing a fluoropolymer of the invention, the melt-kneading mentioned above is carried out in the absence or presence of an alkali metal element or an alkaline earth metal element. According to the method of producing a fluoropolymer of the invention, the stabilization reaction for converting the specific unstable terminal groups (P) to —CF$_2$H can proceed to a satisfactory extent even in the absence of the alkali metal element or alkaline earth metal element. From the reactivity control viewpoint, however, the feeding of a compound containing an alkali metal element or a compound containing an alkaline earth metal element to the kneader or the preliminary addition of a compound containing an alkali metal element or a compound containing an alkaline earth metal element to the polymer before feeding to the kneader is not excluded.

The above-mentioned compound containing an alkali metal element or an alkaline earth metal element is not particularly restricted but mention may be made of, for example, carbonates such as potassium carbonate and calcium carbonate; hydroxides such as potassium hydroxide and sodium hydroxide; sulfates such as potassium sulfate; and nitrates such as potassium nitrate.

In the above melt-kneading, the mass of the alkali metal element or alkaline earth metal element is not greater than 2 ppm of the composition under melt-kneading. A preferred upper limit to the alkali metal element or alkaline earth metal element concentration is 1.5 ppm, a more preferred upper limit is 1 ppm, a still more preferred upper limit is 750 ppb, and a most preferred upper limit is 350 ppb.

The "composition under melt-kneading" so referred to herein is the composition which occurs in the kneader and comprises the above-mentioned fluoropolymer (A) and not greater than 2 ppm of an alkali metal element or alkaline earth metal element. The composition under melt-kneading includes the whole material within the kneader irrespective of the zone in which it occurs, the plasticization zone, stabilization treatment zone and/or degassing zone, which are to be described later herein.

The method of producing a fluoropolymer of the invention can cause the above-mentioned stabilization reaction to occur even in the absence of the above-mentioned alkali metal element or alkaline earth metal element. Therefore, it is not necessary to add an alkali metal element or alkaline earth metal element for causing the stabilization reaction to proceed. In cases where the alkali metal element or alkaline earth metal element is not added for causing the stabilization reaction, the composition under melt-kneading contains no such element or contains only the trace thereof originating in such an additive as polymerization initiator and, even in the latter case, the concentration of such element in the composition under melt-kneading is not greater than 2 ppm, as mentioned above.

When the composition under melt-kneading has a melt flow rate [MFR] of not lower than 16 (g/10 minutes) under the conditions of a temperature of 372° C. and a load of 5.0 kg, the mass of the alkali metal element or alkaline earth metal element is preferably not greater than 2 ppm of the composition under melt-kneading and, when the composition under melt-kneading has a melt flow rate [MFR] of not lower than 10 (g/10 minutes) under the conditions of a temperature of 372° C. and a load of 5.0 kg, the mass in question is preferably not greater than 1 ppm.

The mass of the alkali metal element or alkaline earth metal element is preferably smaller than 350 ppb irrespective of the above-mentioned MFR value.

The concentration of the alkali metal element or alkaline earth metal element is the value obtained by atomic absorption spectrometry.

The kneader to be used in carrying out the method of producing a fluoropolymer of the invention is preferably a screw-type extruder, more preferably a multi-screw kneader. As the multi-screw kneader, there may be mentioned, for example, a twin-screw extruder and a kneader with a very low effective volume ratio. Among them, the twin-screw extruder is preferred since it enables continuous operations with a narrow residence time distribution and makes it possible to increase the reaction zone pressure by melt sealing.

Preferably employed as the twin-screw extruder is the one having a power coefficient K of not lower than 6000, more preferably not lower than 10000, so that the treatment time may be curtailed, although those having a power coefficient lower than 6000 may also be used.

Usable as the twin-screw extruder to be used in the practice of the invention is a vented extruder having a degassing hole and equipped with a degassing system. The vented extruder includes a plasticization zone in which the resin charged is heated and converted into a molten state, a stabilization treatment zone in which melt-kneading is carried out and the specific unstable terminal group (P) is converted to $-CF_2H$, and a degassing zone for removing the high-temperature volatile component(s) formed upon decomposition of the specific unstable terminal group (P).

The heating conditions, such as temperature and time, in the plasticization zone are not particularly restricted provided that the melt-processable fluoropolymer (A) having a specific unstable terminal groups (P) can reach a molten state in that zone.

Preferably, the latter half of the plasticization zone is provided with a degassing hole so that at least part of the volatile component(s) may be removed at ordinary pressure or under reduced pressure. The removal of such at this stage makes it possible to reduce the partial pressure of the volatile component in the stabilization treatment zone to be described later herein and efficiently finish the stabilization treatment.

The stabilization treatment zone is preferably created using kneading disks exerting no propulsive force. For example, the stabilization treatment zone can be constituted in the screw zone just behind the above-mentioned plasticization zone by using kneading disks, seal rings or the like that can readily increase the pressure.

According to the method of producing a fluoropolymer of the invention, the melt-kneading in the above-mentioned stabilization treatment zone is carried out in the presence of water.

The above-mentioned specific unstable terminal group (P), when heated in the presence of water, can be converted to a stable terminal group, $-CF_2H$, by the reaction represented by the reaction formula (1):

$$-CF_2-COX + H_2O \rightarrow -CF_2H + CO_2 + HX \qquad (1)$$

wherein $-COX$ represents the specific unstable terminal group (P).

The phrase "in the presence of water" as used herein means "in the presence of $H_2O$". The condition "in the presence of water" is not particularly restricted provided that the above reaction is allowed to proceed. Thus, for example, it may be the condition resulting from introduction of pure water, deionized water, or water in the form of steam, or the water borne by the fluoropolymer to be treated. $H_2O$ or such $H_2O$-containing one introduced into the stabilization treatment zone for creating the condition "in the presence of water" is herein sometimes referred to as merely "water".

As for the amount of water necessary for carrying out the melt-kneading in the stabilization treatment zone in the presence of water, the same number of water molecules as the number of the specific unstable terminal groups (P) is theoretically sufficient. In practice, however, an excess amount, for example 10 times the amount theoretically required, is preferably fed.

Preferably, the melt-kneading in the stabilization treatment zone is carried out not only in the presence of water but also in the presence of oxygen gas.

Even when carbon is formed in the composition under melt-kneading, the oxygen gas can burn this carbon and thereby prevent the discoloration of the fluoropolymer (B) to be obtained.

The above-mentioned carbon is formed, for example, by the depolymerization reaction of the $-CF=CF_2$ group, as shown by the following reaction formula:

$$-CF=CF_2 \rightarrow -CF_4 + C.$$

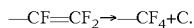

The $-CF=CF_2$ group is formed as a result of cleavage of an unstable bond in the main chain of the fluoropolymer (A), for example the bond between two hexafluoropropylene [HFP] molecules by a shearing force within the kneader.

The composition under melt-kneading in the above-mentioned stabilization treatment zone comprises the above-mentioned fluoropolymer (A), not greater than 2 ppm of an alkali metal element or alkaline earth metal element, and water. The composition under melt-kneading may further comprise the above-mentioned oxygen gas, where desired.

The above-mentioned oxygen gas is a gas inert to the specific unstable terminal groups (P) and can improve the degassing efficiency of carbon dioxide, alcohols, fluoroalcohols, perfluoromethane and ammonia, which have been formed upon decomposition of the specific unstable terminal groups (P), and high-temperature volatile components such as low-molecular-weight substances which may be contained in the composition under melt-kneading.

The above-mentioned condition "in the presence of oxygen gas" may be the presence of oxygen gas alone but preferably is the presence of a dilution of oxygen gas diluted with a diluent gas inert to the specific unstable terminal groups (P) to an oxygen gas concentration of 10 to 30% by volume, for instance. The diluent gas is not particularly restricted but may be, for example, nitrogen or argon.

From the economy viewpoint, the condition "in the presence of oxygen gas" generally means the presence of air.

The inside pressure in the stabilization treatment zone is preferably increased. By increasing the pressure, it becomes possible to reduce the partial pressure of the high-temperature volatile components to be removed and/or promote the penetration of the optionally introduced oxygen into the composition under melt-kneading and, as a result, increase the efficiency of removal of the high-temperature volatile components.

The absolute pressure in the stabilization treatment zone is preferably at a level exceeding atmospheric pressure, generally exceeds atmospheric pressure but is not higher than 12 MPa. At levels below atmospheric pressure, the contacting and mixing of the composition under melt-kneading with oxygen, when the melt-kneading is carried out in the presence of oxygen, may become insufficient in some instances. At levels exceeding 12 MPa, the degassing effect is not more proportional to the pressure applied. A preferred lower limit to the absolute pressure in the stabilization treatment zone is 0.2 MPa, a more preferred lower limit is 0.3 MPa, a preferred upper limit is 10 MPa and a more preferred upper limit is 7 MPa. In the case of introducing oxygen, the absolute pressure in the stabilization treatment zone is preferably not lower than the vapor pressure of the inert gas in the stabilization treatment zone from the degassing efficiency improvement viewpoint.

The time during which the pressurized condition is to be maintained in the stabilization treatment zone is not particularly restricted but is generally shorter than 10 minutes, although it may vary depending on the temperature to be set, the presence or absence of the inert gas mentioned above, the amount thereof if present, and the structure of the vented extruder, among others. When it is 10 minutes or longer, a shearing force tends to be exerted on the composition under melt-kneading and deteriorate the same.

The temperature to be set in the stabilization treatment zone is preferably 280 to 430° C.

At below 280° C., insufficient melting will result, the composition under melt-kneading will become insufficient in surface renewal and/or mixing with water and with optionally introduced oxygen, and degassing will be hardly promoted. At temperatures exceeding 430° C., the fluoropolymer (B) obtained may become deteriorated in quality in certain instances. A more preferred lower limit is 330° C., and a more preferred upper limit is 410° C.

While the absolute pressure in the above-mentioned degassing zone may vary depending on the molten state of the composition under melt-kneading and the operation conditions such as the screw revolution rate of the kneader, the pressure is preferably reduced to such an extent that the composition under melt-kneading will not enter the exhaust nozzle and the absolute pressure may be within the range of 0.01 to 0.1 MPa, for example 0.05 MPa.

The temperature in the degassing zone is preferably within the range of 130 to 300° C. At below 130° C., the viscosity of the composition under melt-kneading will be high and the stirring will readily become difficult and, at above 300° C., the composition under melt-kneading may be decomposed and this may lead to deterioration in quality in some cases. A more preferred lower limit is 250° C., and a more preferred upper limit is 275° C.

The method of producing a fluoropolymer of the invention produces the fluoropolymer (B) by carrying out the above-mentioned melt-kneading. The fluoropolymer (B) is a product resulting from conversion of the specific unstable terminal groups (P) in the fluoropolymer (A) to —$CF_2H$. The fluoropolymer (B) is generally a melt-processable fluoropolymer having the same polymer composition as the fluoropolymer (A). The polymer composition is expressed in terms of the monomer species and the polymerization ratio thereof, as described hereinabove referring to the fluoropolymer (A).

The fluoropolymer (B) is preferably the one resulting from conversion of all specific unstable terminal groups (P) in the fluoropolymer (A) to —$CF_2H$ but may be the one in which a very small proportion of the specific unstable terminal groups (P) remain unconverted to —$CF_2H$ according to the conditions of the above-mentioned melt-kneading. Even when the conversion of the specific unstable terminal groups (P) to —$CF_2H$ as attained by the melt-kneading according to the method of producing a fluoropolymer of the invention is not 100%, the fluoropolymer (B) obtained is relatively high in thermal stability since such groups (P) are stable as compared with the —COF and —COOM (M being as defined above) groups so far known as unstable terminal groups in fluoropolymers. Therefore, it is an advantageous feature of the invention that even when certain variations are caused in melt-kneading conditions, the molded articles produced by molding using the fluoropolymer (B) obtained show no great variations in quality.

According to the method of producing a fluoropolymer of the invention, it is not necessary to subject the fluoropolymer (B) obtained to stabilization treatment using a fluorine radical generator such as fluorine gas. It is to be noted, however, that carrying out the stabilization treatment using a fluorine radical generator is not excluded.

The discharge comprising the fluoropolymer (B) as discharged through the degassing zone may be subjected to strand cutting or hot cutting, for instance, for the preparation of pellets, or can be directly molded into films or tubes according to the intended use.

The above-mentioned fluoropolymer (B), when subjected to melt molding, hardly forms air bubbles or voids in the molded articles obtained and, when the melt-kneading in the stabilization treatment zone is carried out in the presence of oxygen, the polymer is hardly discolored.

The fluoropolymer produced by the method of producing a fluoropolymer mentioned above also constitutes an aspect of the present invention. Namely, the fluoropolymer produced by the above-mentioned method of producing a fluoropolymer is the above-mentioned fluoropolymer (B).

The fluoropolymer of the invention preferably has a melt flow rate [MFR] of 12 to 37 (g/10 minutes). When the rate is less than 12 (g/10 minutes), cornbreak or sparkout due to melt fracture may be observed in the case of using the polymer in electric wire covering, for instance, so that it may become difficult to raise the covering speed. A more preferred lower limit to the MFR is 16 (g/10 minutes), a still more preferred lower limit is 21 (g/10 minutes), and a more preferred upper limit is 34 (g/10 minutes).

The above-mentioned MFR is the value obtained by carrying out measurements under the conditions of a temperature of 372° C. and a load of 5.0 kg according to ASTM D 1238.

When the fluoropolymer of the invention is used as an electric wire- or like core-covering material, the adhesion strength in strip testing can be made 1.2 kg or higher. A preferred lower limit to the adhesion strength is 1.5 kg and a more preferred lower limit is 1.7 kg.

The fluoropolymer of the invention having polymer terminal —$CF_2H$ groups can be said to be superior in adhesion to other materials as compared with fluoropolymers whose terminal functional group is —$CF_3$.

The above-mentioned strip testing is carried out in the following manner.

First, a core wire [core standard: AWG24, core diameter: 20.1 mil (=about 0.51 mm)] is prepared and a covered wire is produced by extrusion covering of the core at a covering speed of 2400 feet/minute so that the covering material thickness may amount to 7.5 mil (about 0.19 mm) and the covered wire outside diameter to 35.1 mil (about 0.89 mm).

The covered wire is cut to pieces, 15 cm in length, and a 7.5-cm portion of the insulator is peeled off from one end of each piece, leaving another 7.5-cm portion from the other end. The thus-prepared pieces whose 7.5-cm portion has the covering and whose 7.5-cm portion is a bare core wire are used as test specimens.

The measuring apparatus to be used is an Instron model 4301 tensile tester and a metal plate having a cylindrical hole as schematically shown in FIG. 1.

The metal plate shown in FIG. 1 is held rigidly on a fixing side chuck (in this case, the lower chuck) of the tensile tester. On the occasion of holding, the cylindrical hole is arranged parallel to the direction of pull. Each test specimen prepared is passed through the hole of the fixed metal plate from the lower end to the upper end of the hole. The resulting state is such that the bare core wire portion is above the hole of the metal plate and the covered portion, which is greater in diameter than the hole, is below the same. The bare core wire portion protruding above from the hole is inserted into a mobile side chuck (in this case, the upper chuck) and the test specimen is pulled upward at a rate of 50 mm/minute. Since the core wire is smaller in diameter than the cylindrical hole, the core wire alone is pulled while the covering is peeled off. The force measured at the time of peeling off is recorded. Five specimens are subjected to testing, the maximum and minimum measured values are discarded, and the mean of the remaining three data is reported.

The fluoro-polymerised material of the invention comprises a fluoropolymer.

The above "fluoro-polymerised material" is one substantially comprising a fluoropolymer.

The phrase "substantially comprising a fluoropolymer" means that the fluoropolymer accounts for at least 50% by mass of the fluoro-polymerised material.

The fluoro-polymerised material of the invention is not necessarily required to be the one obtained by the method of producing a fluoropolymer of the invention but can be easily obtained by the method of producing a fluoropolymer of the invention.

The above-mentioned fluoropolymer in the fluoro-polymerised material of the invention is not necessarily required to be the fluoropolymer (B) obtained by the method of producing a fluoropolymer of the invention but preferably is the fluoropolymer (B). As for the polymer composition, the above fluoropolymer, like the fluoropolymer (B) or, in other words, the fluoropolymer (A), preferably comprises (1) a fluorocopolymer derived from at least one fluoromonomer selected from the group consisting of tetrafluoroethylene [TFE], hexafluoropropylene [HFP], vinylidene fluoride [VdF] and chlorotrifluoroethylene [CTFE], (2) a chlorotrifluoroethylene homopolymer [PCTFE] and/or (3) a vinylidene fluoride homopolymer [PVdF], the fluorocopolymer being one resulting from polymerization of a perfluoro (alkyl vinyl ether) [PAVE] and/or ethylene [Et] or one not resulting from such polymerization.

In the fluoro-polymerised material of the invention, the fluoropolymer is preferably a fluorocopolymer derived from TFE and HFP.

The fluorocopolymer derived from TFE and HFP is preferably a fluorocopolymer derived from TFE, HFP and a PAVE, more preferably a fluorocopolymer having a tetrafluoroethylene unit content of 75 to 95% by mass, a hexafluoropropylene unit content of 5 to 20% by mass and a perfluoro (alkyl vinyl ether) unit content of 0 to 5% by mass.

The above fluoropolymer is one of which polymer terminal groups are —$CF_2H$ and not more than 20 unstable terminal groups (Q) per $10^6$ carbon atoms.

The unstable terminal groups (Q) are functional groups lower in thermal stability than —$CF_2H$. As the unstable terminal groups (Q), there may be mentioned, for example, the specific unstable terminal groups (P) mentioned hereinabove; —CF=$CF_2$; —COF; —COOH; and —COOH alkali metal salts or alkaline earth metal salts.

A preferred upper limit to the number of the unstable terminal groups (Q) per $10^6$ carbon atoms in the above-mentioned fluoropolymer is 15, a more preferred upper limit is 10, and the lower limit can be set at 0.

The above-mentioned fluoropolymer can be obtained by a polymerization method known in the art, for example by suspension polymerization or emulsion polymerization. The fluoropolymer, when obtained by suspension polymerization, tends to contain low-molecular-weight components. The low-molecular-weight components may become volatile matter in the step of melt-molding which is carried out at elevated temperatures. Therefore, the fluoropolymer is preferably the one obtained by emulsion polymerization.

While polymerization reaction product polymers obtained by emulsion polymerization contains polymerization initiator-derived carboxyl [—COOH] and other unstable terminal groups, the polymer chain termini can be readily converted to stable —$CF_2H$ groups by converting the unstable terminal groups (Q) to alkoxycarbonyl, fluoroalkoxycarbonyl and/or carboxylic acid quaternary nitrogen compound salts and then carrying out melt-kneading in a kneader comprising a stabilization treatment zone, as in the case of the method of producing a fluoropolymer of the invention. The fluoropolymer in the fluoro-polymerised material of the invention, when obtained by using, for example, the method of producing a fluoropolymer of the invention, can have the above-mentioned polymer chain termini even when the fluoropolymer is the product of emulsion polymerization.

The fluoro-polymerised material comprises the above-mentioned fluoropolymer and, further, contains or does not contain a metal residue containing an alkali metal element and/or alkaline earth metal element. When the melt-kneading is carried out in the presence of an alkali metal element or alkaline earth metal element or when a polymerization initiator containing an alkali metal element, for example potassium persulfate, is used in the process of polymerization, for instance, the above-mentioned fluoro-polymerised material may contain a trace amount of a metal residue. It is not necessary to positively add an alkali metal element and/or alkaline earth metal element for the purpose of stabilizing the unstable terminal groups. The term "metal residue" as used herein includes, within the meaning thereof, alkali metal elements and/or alkaline earth metal elements or metal compounds containing these metal elements.

Preferred as the polymerization initiator are persulfate salts and, from the metal residue reduction viewpoint, ammonium persulfate is more preferred.

The above-mentioned fluoro-polymerised material contains the above-mentioned alkali metal element and/or alkaline earth metal element in an amount, by mass, of not greater than 2 ppm of the fluoro-polymerised material. A preferred upper limit to the alkali metal element and/or alkaline earth metal element concentration is 1.5 ppm, a more preferred upper limit is 1 ppm, a still more preferred upper limit is 750 ppb, and a most preferred upper limit is 350 ppb. When an alkali metal element and an alkaline earth metal element are both used, the mass of the above-mentioned alkali metal element and/or alkaline earth metal element is the sum of the mass of both.

When the fluoropolymer has a melt flow rate [MFR] of not lower than 16 (g/10 minutes), the mass of the alkali metal element and/or alkaline earth metal element in the fluoro-polymerised material of the invention is preferably not greater than 2 ppm and, when the fluoropolymer has a MFR of not lower than 10 (g/10 minutes), the mass in question is preferably not greater than 1 ppm.

The mass of the alkali metal element and/or alkaline earth metal element in the fluoro-polymerised material of the invention is preferably smaller than 350 ppb irrespective of the above-mentioned MFR value.

Since, in accordance with the method of producing a fluoropolymer of the invention, the terminal group stabilization reaction shown by the reaction formula (1) can proceed to a satisfactory extent even when no alkali metal element or alkaline earth metal element is present, as mentioned hereinabove, the lower limit to the metal residue concentration can be set at 0 ppm, which means complete absence.

The content of the alkali metal and/or alkaline earth metal as mentioned above is the value obtained by atomic absorption spectrometry.

The examples and preferred polymer compositions of the above-mentioned fluoropolymer are the same as those described hereinabove referring to the fluoropolymer (A).

While the fluoro-polymerised material of the invention may have a yellow index [YI] of not higher than 2, the material preferably has a yellow index of not higher than −1, more preferably not higher than −5, still more preferably not higher than −7.

The fluoro-polymerised material of the invention is inhibited from being discolored so that the YI thereof may fall within the range mentioned above.

The YI is the value obtained by using a color difference meter (trademark: CM-3500d, product of Minolta) according to ASTM D 1925.

The fluoro-polymerised material of the invention preferably has a volatile matter index of not higher than 25. At levels exceeding 25, air bubbles and voids formed during melting/processing cause problems. A more preferred upper limit to the volatile matter index is 20, and a still more preferred upper limit is 15.

The volatile matter index mentioned above is the value obtained by the method described in WO 98/09784.

The fluoropolymer obtained according to the invention and the fluoro-polymerised material of the invention are chemically inert and have good electric insulating properties, thermal stability and toughness and can be used in producing various moldings such as covering materials for cables, wires and the like, tubes, films, sheets and filaments, among others.

Effects of the Invention

The method of producing a fluoropolymer of the invention, which has the constitution described hereinabove, can give fluoropolymers having highly stable terminal groups and showing good moldability.

BEST MODES FOR CARRYING OUT THE INVENTION

The following examples are further illustrative of the present invention. These examples are, however, by no means limitative of the scope of the invention.

The methods of measuring the parameters employed herein are described below. The data given in the Examples and Comparative Examples are those obtained by the measurement methods given below.

(Volatile Matter Index: VI)

As a means for evaluating the amount of the volatile matter generated upon melt molding of a polymer, there is known the volatile matter index (VI) shown below (cf. WO 98/09784).

A 10-g portion of a polymer sample is placed in a heat-resistant vessel, which is then placed in a high-temperature block maintained at 380° C. for attaining thermal equilibrium. Thereafter, the changes in pressure are recorded at 10-minute intervals for 60 minutes. The volatile matter index (VI) value is calculated by the following formula:

$$\text{Volatile matter index} = (P_{40} - P_0) \times V/10/W$$

Where $P_0$ and $P_{40}$ are the pressures (mm Hg) before ($P_0$) insertion into the high-temperature block and at 40 minutes ($P_{40}$) after insertion, respectively, V is the volume (ml) of the vessel and W is the mass (g) of the sample.

(Terminal Group Determinations)

Terminal groups other than —$CF_2H$ and —$C(=O)OCH_3$ were quantitated one by one by the infrared spectrophotometric method described in U.S. Pat. Nos. 3,085,083, 4,675,380, Japanese Kokai Publication H04-20507 and elsewhere. The evaluation was made for each terminal group species in terms of the number of terminal groups per $10^6$ carbon atoms.

The —$CF_2H$ and —$C(=O)OCH_3$ groups were determined by molten-state NMR spectrometry.

(Metal Content Measurement)

Two grams of pellets were weighed in a platinum dish and then incinerated in a muffle furnace at 580° C. over 30 minutes. The platinum dish was washed with 20 g of 0.1 N hydrochloric acid, and the washings were analyzed by atomic absorption spectrometry (trademark: Model Z-8100 Polarized Zeeman Atomic Absorption Spectrophotometer, product of Hitachi).

(Discoloration Degree Evaluation)

Pellets or a powder was placed in a glass vessel (3 cm in diameter) to a height of 1 cm, the upper cover used was white, and the side was shielded against light entering from outside. The yellow index [YI] was measured according to ASTM D 1925 using a color difference meter (trademark: CM-3500d, product of Minolta).

(Melt Flow Rate [MFR])

According to ASTM D 1238, the mass (g/10 minutes) of the copolymer extruded through an orifice, 2.09 mm in inside diameter and 8 mm in length, during 10 minutes under the conditions of a temperature of 372° C. and a load of 5.0 kg was measured using a melt indexer (manufactured by Kayness).
(Adhesion Strength)
Strip testing was carried out as described above, and the force required for peeling off the covering portion from the covered wire was measured.

EXAMPLE 1

A fluorocopolymer obtained by emulsion polymerization using ammonium persulfate as the polymerization initiator was used as the raw material. The fluorocopolymer had the following composition: a tetrafluoroethylene [TFE] unit content of 86.5% by mass, a hexafluoropropylene [HFP] unit content of 12.5% by mass, and a perfluoro(propyl vinyl ether) ($CF_2=CFOC_3F_7$) unit content of 1% by mass. This fluorocopolymer was coagulated using nitric acid, and the coagulate was dehydrated by squeezing and dried at 170° C. for 4 hours. At this raw material stage, the fluorocopolymer had a melt flow rate [MFR] of 25.5 (g/10 minutes).
Then, the terminal groups of the fluorocopolymer were methyl-esterified with methanol, and the fluoropolymer (A) obtained was fed to the hopper of a twin-screw extruder (manufactured by Japan Steel Works, shaft diameter=32 mm, L/D=52.5), and melt-kneading was carried out. The first barrel of the extruder was used as a feeding zone, the second to sixth barrels were used as the melt-plasticizing zone, the 7th to 12th barrels as the stabilization treatment zone, and the 13th to 15th barrels as the venting (degassing) zone.
Air was introduced into the kneader from the 7th barrel at a rate of 0.93 kg/hour, and water was introduced thereinto from the 8th barrel at a rate of 0.6 kg/hour. The 13th and 14th barrels were vented; the vent port in the 13th barrel was open, and the absolute pressure at the vent port in the 14th barrel was set at 0.05 MPa. Throughout the stabilization treatment zone, the temperature was set at 380° C., the pressure at 2 to 3.8 MPa, the screw revolution rate at 225 rpm, and the raw material throughput at 15 kg/hour, and the material was fed by means of a constant mass feeder. The fluorocopolymer melt-extruded/processed was subjected to strand cutting to give pellets of a fluoropolymer (B).

EXAMPLE 2

The procedure of Example 1 was followed in the same manner except that the temperature in the stabilization treatment zone (7th to 12th barrels) was maintained at 330° C. and the screw revolution rate was 95 rpm and that air was not introduced into the kneader.

EXAMPLE 3

The procedure of Example 1 was followed in the same manner except that air was not introduced into the kneader.

COMPARATIVE EXAMPLE 1

The procedure of Example 1 was followed in the same manner except that a 0.1% (by mass) aqueous solution of potassium carbonate [$K_2CO_3$] was added to the fluoropolymer (A) so that potassium carbonate [$K_2CO_3$] might amount to 15 ppm by mass and, after evaporation of the moisture, the fluoropolymer was fed to the extruder and that the rate of addition of air was 0.078 kg/hour.

COMPARATIVE EXAMPLE 2

The procedure of Example 1 was followed in the same manner except that the terminal groups of the raw material used were not methyl-esterified.

REFERENCE EXAMPLE

A polymer was obtained in the same manner as in Example 1 except that fluorine gas was caused to act on the pellets of the fluoropolymer (B).
The results obtained in the above examples are shown in Table 1

TABLE 1

| | | After polymerization and drying but before esterification | Fluoropolymer (A) | Example 1 | Example 2 | Example 3 | Comparative Example 1 | Comparative Example 2 | Reference Example |
|---|---|---|---|---|---|---|---|---|---|
| Number of terminal groups (groups/$10^6$ carbon atoms) | —COF | 0 | 0 | 0 | 10 | 0 | 0 | 5 | 0 |
| | —COOH monomer | 150 | 0 | 0 | 0 | 0 | 0 | 125 | 0 |
| | —COOH associate | 450 | 0 | 0 | 10 | 0 | 0 | 270 | 0 |
| | —CF=$CF_2$ | 0 | 0 | 0 | 0 | 0 | 0 | 0 | 0 |
| | —$COOCH_3$ | — | 500 | 0 | 270 | 10 | 0 | — | 0 |
| | —$CF_2H$ | 0 | 0 | 450 | 190 | 500 | 475 | 70 | 0 |
| Evaluation method | Volatile matter index | 75 | 20 | 7 | 15 | 9 | 7 | 38 | — |
| | Total metal content | 1 ppm以下 | — | ≦1 ppm | ≦1 ppm | ≦1 ppm | About 14 ppm | ≦1 ppm | ≦1 ppm |
| | Yellow index | — | — | −8 | −5 | 2 | −8 | −3 | — |
| | MFR(g/10 min) | 25.6 | 25.2 | 25 | 25.4 | 29.0 | 25.5 | 26 | 25.1 |
| | Adhesion strength(kg) | — | — | 1.8 | — | — | — | — | 0.4 |

From Table 1, it was revealed that, in Example 1, most of methyl-esterified terminal groups had been converted to —$CF_2H$ groups in spite of the nonuse of any alkali metal and, like in Comparative Example 1 where an alkali metal was used, no unstable terminal groups had been formed. It was also revealed that the adhesion strength was superior in Example 1 than in Reference Example 1 where fluorine gas was caused to act.
In Examples 1 to 3 where methyl esterification was performed, the proportions of such unstable terminal groups as —COF and —COOH as found after melt-kneading were smaller and the volatile matter indices were lower than in Comparative Example 2 where the esterification was omitted.

INDUSTRIAL APPLICABILITY

The method of producing of the invention requires no equipment for the removal of fluorine gas or the like material which is hazardous to human health, is advantageous from the cost and environment viewpoint in fluoropolymer production and markedly reduces the possibility of deposit formation in the molding machine in molding the fluoropolymer obtained; a reduction in running cost can also be expected.

The invention claimed is:

1. A method of producing a fluoropolymer by which a melt-processable fluoropolymer (A) having a specific unstable terminal group or groups (P) is subjected to melt-kneading in a kneader comprising a stabilization treatment zone to thereby produce a fluoropolymer (B) resulting from conversion of said specific unstable terminal group or groups (P) to —$CF_2H$, said specific unstable terminal group or groups (P) comprising alkoxycarbonyl groups and/or fluoroalkoxycarbonyl groups, the melt-kneading being carried out in the absence or presence of an alkali metal element or alkaline earth metal element, the content of said alkali metal element or alkaline earth metal element being not greater than 2 ppm of the composition under melt-kneading, and the melt-kneading in said stabilization treatment zone being carried out in the presence of water.

2. The method of producing a fluoropolymer according to claim 1, wherein the melt-kneading in the stabilization treatment zone is carried out in the presence of oxygen gas.

3. The method of producing a fluoropolymer according to claim 1, wherein the kneader is a screw-type extruder.

4. The method of producing a fluoropolymer according to claim 3, wherein the screw-type extruder is a twin-screw extruder.

5. The method of producing a fluoropolymer according to claim 1, wherein the temperature in the stabilization treatment zone is set at 280 to 430° C.

* * * * *

UNITED STATES PATENT AND TRADEMARK OFFICE
CERTIFICATE OF CORRECTION

PATENT NO. : 8,080,195 B2  
APPLICATION NO. : 10/579790  
DATED : December 20, 2011  
INVENTOR(S) : Yoshiyuki Takase, Kenji Ishii and Shouji Fukuoka Page 1 of 1

It is certified that error appears in the above-identified patent and that said Letters Patent is hereby corrected as shown below:

Cover page, delete the following, item

"(73) Assignee: DAIKIN INDUESTRIES, LTD., Tokyo (JP)"

and insert the following, item

--(73) Assignee: DAIKIN INDUSTRIES, LTD., Osaka (JP)--

Signed and Sealed this  
Third Day of July, 2012

David J. Kappos  
*Director of the United States Patent and Trademark Office*